Figure 1:
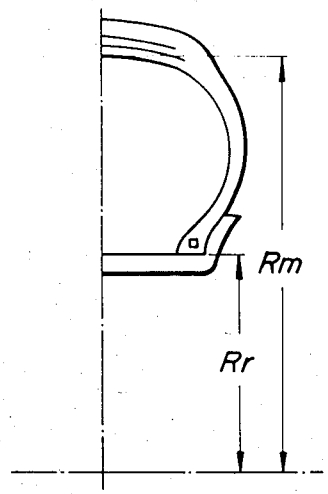

United States Patent [19]

Imai et al.

[11] Patent Number: 4,628,978
[45] Date of Patent: Dec. 16, 1986

[54] PNEUMATIC RADIAL TIRES

[75] Inventors: Isamu Imai, Tokorozawa; Kazuo Oshima, Kodaira; Norio Inada, Fuchu, all of Japan

[73] Assignee: Bridgestone Tire Company Limited, Tokyo, Japan

[21] Appl. No.: 700,344

[22] Filed: Feb. 13, 1985

Related U.S. Application Data

[63] Continuation of Ser. No. 541,633, Oct. 13, 1983, abandoned.

[30] Foreign Application Priority Data

Oct. 21, 1982 [JP] Japan .................. 57-184816

[51] Int. Cl.⁴ .................. B60C 9/08; B29C 71/00
[52] U.S. Cl. .................. 152/556; 152/451; 156/110.1; 264/501; 264/234; 264/345; 264/348; 264/176.1; 425/28 P
[58] Field of Search .................. 152/556, 451, 527; 156/110.1, 130.5; 264/501–502, 519–521, 231, 234, 237, 345, 348, 176 F; 425/28 P

[56] References Cited

U.S. PATENT DOCUMENTS

| | | | |
|---|---|---|---|
| 3,616,832 | 11/1971 | Shima et al. | 152/361 |
| 3,854,515 | 12/1974 | Takemura et al. | 152/359 |
| 3,956,443 | 5/1976 | Shichman | 264/502 |
| 4,043,985 | 8/1977 | Vock | 152/359 |
| 4,101,525 | 7/1978 | Davis et al. | 264/176 F |
| 4,195,052 | 3/1980 | Davis et al. | 264/235 |
| 4,420,453 | 12/1983 | Ayers | 264/502 |

FOREIGN PATENT DOCUMENTS

| | | | |
|---|---|---|---|
| 0144106 | 9/1982 | Japan | 152/359 |
| 57-154410 | 9/1982 | Japan . | |

*Primary Examiner*—Lois E. Boland
*Attorney, Agent, or Firm*—Sughrue, Mion, Zinn, Macpeak, and Seas

[57] ABSTRACT

A pneumatic radial tire having a high durability is disclosed, which comprises a carcass composed of at least one ply containing polyester fiber cords embedded in rubber. This polyester fiber cord has particular fiber properties and cord properties. Among the cord properties, the elongation under a tension of 2 g/D of the cord after the specific post-cure inflation treatment is not more than 4.5% and the sum of the elongation and heat shrinkage is not more than 8.0%.

3 Claims, 2 Drawing Figures

PNEUMATIC RADIAL TIRES

This is a continuation of application Ser. No. 541,633, filed Oct. 13, 1983, now abandoned.

This invention relates to high-durable pneumatic radial tires using polyester fiber cords as a carcass ply.

In general, separation failure exists at a belt end and at carcass turnup end in bead portion and impedes the durability of the radial tire. In this connection, it is well-known that the material for carcass, particularly ply cord for carcass has a great influence upon both the above failures. That is, when an internal pressure is applied to the radial tire, the ply cord extends while under tension and further causes a creeping phenomenon due to the running, so that circumferential lengths of crown portion and shoulder portion and width of the tire become increased. As a result, strain concentrates in the belt end and in turnup end of the ply cord because in the latter case, the bead portion is further pushed to an end of a rim due to the increase of tire width. For this end, it is also known that the ply cord should have a small elongation at an initial bearing stage on internal pressure (i.e. high modulus or elasticity) and small creep.

For this purpose, steel cord, Kevlar (trade name) cord, rayon fiber cord, polyester fiber cord, nylon fiber cord and the like are available or tested as a material for carcass in radial tires. Among them, steel cord is predominantly used as a carcass material in radial tires for truck and bus, while rayon and polyester fiber cords are predominantly used as a carcass material in radial tires for passenger cars. Although they have merits and demerits, respectively, polyester fiber cord is best in the general-purpose properties in view of mechanical fatigue property, stability on moisture, corrosion resistance, adhesion property, high modulus of elasticity and creep resistance. Lately, therefore, the use of the polyester fiber cord as the carcass material successively increased and further the modification of the polyester fiber into higher modulus one and the like are more performed.

As a method of producing higher modulus polyester fiber cords, there have hitherto been proposed a method of reducing an intrinsic viscosity in the preparation of the fiber, a method of spinning the fiber under a high stress, a method of reducing a twist constant in the fiber cord, a method of rendering the fiber cord into a high tension state, and the like. However, the reduction of intrinsic viscosity largely degrades the tensile strength and mechanical fatigue resistance, while the reduction of twist constant is able to increase the tensile strength and modulus of elasticity but degrades the mechanical fatigue resistance. On the other hand, the application of high tension to the cord gives a higher modulus cord but makes the heat shrinkage large to cause troubles on the dimensional stability. Under such circumstances, polyester fiber cords, the heat shrinkage of which are small even if the cord is subjected to high tension treatment after the spinning under high stress, have recently begun to be applied to tires as disclosed, for example, in U.S. Pat. Nos. 4,101,525 and 4,195,052 together with Japanese Patent laid-open No. 57-154,410.

In this case, however, there is a problem that even when the higher modulus polyester fiber cords obtained by spinning under high stress and being subjected to high tension treatment are applied to the tire, they shrink due to heat generated in vulcanization building of the tire. That is, the modulus of elasticity of the high-tension heat-treated cord, which is obtained with much effort by applying a predetermined adhesive at a temperature of not less than 230° C. but not more than the melting point of polyester and then applying a tension, inversely deteriorates during the vulcanization building of tire.

It is, therefore, an object of the invention to improve the durability of the tire, which has never been achieved in the conventional tire using usual polyester fiber cords as a carcass ply, by combining the high-stress spun polyester fiber with optimum post-cure inflation conditions.

The term "post-cure inflation" used herein means a procedure of setting a tire under a predetermined internal pressure over a predetermined period after the vulcanization building.

According to the invention, there is the provision of a pneumatic radial tire comprising a carcass composed of at least one ply containing polyester fiber cords embedded in rubber, said polyester fiber cord having such micro properties as a fiber that an intrinsic viscosity is 0.75–0.97, a specific gravity is 1.365–1.398 and number of terminal carboxyl groups is not more than 20, and having such properties as a cord that a twist constant NT defined by the following equation (1) is 0.4–0.6 and an elongation $\Delta E_n$ under a tension of 2 g/denier (hereinafter abbreviated as g/D) in the cord produced through a post-cure inflation (hereinafter abbreviated as PCI) holding an inner temperature of a shoulder portion at at least 95° C. under an internal pressure P defined by the following equation (3) in accordance with a carcass tension coefficient $\alpha$ defined by the following equation (2) is not more than 4.5% and a sum of the elongation $\Delta E_n$ and a heat shrinkage $\Delta S$ is not more than 8%:

$$NT = N \times \sqrt{0.139 \times D/2\rho} \times 10^{-3} \tag{1}$$

(wherein N is a twisting number per 10 cm of cord length, D is a total denier of cord and $\rho$ is a specific gravity of fiber);

$$\alpha = \frac{2N'iR_m}{R_m^2 - R_r^2} \tag{2}$$

(wherein N' is number of carcass plies, i is a cord count of carcass ply in crown center (cords/cm), $R_m$ is a maximum radius of carcass line as shown in FIG. 1 (cm) and $R_v$ is an average value of $R_m$ and $R_r$ representing a radius of a rim as shown in FIG. 1); and $$0.5D.\alpha \times 10^{-3} \leq P \leq 2.5D.\alpha \times 10^{-3} \tag{3}$$

The term "heat shrinkage $\Delta S$" used herein means a shrinkage (%) after the cord is heated at 177° C. for 30 minutes.

According to the invention, the reason why the polyester fiber is necessary to satisfy the micro properties within the above defined ranges is due to the fact that when the intrinsic viscosity is less than 0.75, the heat shrinkage is small but the tensile strength and flex fatigue resistance lower to such an extent that they are unsuitable as a ply material for tire, while when the intrinsic viscosity exceeds 0.97, the heat shrinkage is large to adversely affect the dimensional stability, and further when the number of terminal carboxyl groups exceeds 20, the heat aging resistance of the cords embedded in rubber deteriorates to such an extent that the cords are unsuitable as a cord for usual tires.

In a preferred embodiment according to the invention, the polyester fiber has a birefringence $\Delta N$ of $165\times 10^{-3}$–$195\times 10^{-3}$. When $\Delta N$ is less than $165\times 10^3$, the heat aging resistance after the heat treatment and the tensile strength are insufficient, while when $\Delta N$ exceeds $195\times 10^{-3}$, sufficiently stable crystalline.amorphous state is not obtained.

On the other hand, in the polyester fiber cord according to the invention, when the twist constant NT is less than 0.4, the flex fatigue resistance is extremely deteriorated and the resulting cords are unsuitable as a ply material for tire, while when NT exceeds 0.6, the satisfactory tensile strength and modulus of elasticity of the cord are not obtained.

In the PCI after vulcanization, when the inner temperature of the shoulder portion is less than 95° C., the temperature of the polyester fiber cord is a temperature lower than the glass transition temperature of polyester, so that it is difficult to produce orientation of molecular chain in the amorphous portion of the polyester fiber even when a tension is applied to the cord and also the elongation under a tension of 2 g/D cannot be made to not more than 4.5%. Furthermore, when the internal pressure P is less than $0.5D.\alpha\times 10^{-3}$, a sufficient tension cannot be applied to the cord and $\Delta E_n$ of not more than 4.5% is not obtained, while when P exceeds $2.5D.\alpha\times 10^{-3}$, there is caused a risk of breaking cords.

According to the invention, $\Delta E_n$ of not more than 4.5% and $\Delta E_n + \Delta S$ of not more than 8.0% are obtained by restricting the micro properties of the polyester fiber, the twist count NT of the polyester fiber cord and the conditions of PCI as described above. Therefore, when the polyester fiber cords having such properties are applied to the carcass and belt of the tire, the stress concentration at ends of the carcass and belt is suppressed to prevent the occurrence of separation failure at these ends, whereby the durability of the tire can be improved considerably.

As to heat treating conditions under a high tension, when the treating temperature is less than 230° C., the adhesion property degrades and the heat shrinkage increases, while when the treating temperature exceeds 255° C., a sufficient tension cannot be applied to the cord because this temperature is near to the melting point of polyester crystal. Further, when the tension is less than 0.15 g/D, the molecular orientation of amorphous portion cannot sufficiently be taken, while when the tension exceeds 1.0 g/D, the cords are broken.

That is, the high-tension heat treatment is preferably carried out at a temperature of 230°-255° C. under a tension of 0.15-1.0 g/D so as to obtain $\Delta E_n + \Delta S$ of not more than 8.0% after an adhesive is applied to the cord in order to provide a good adhesion to rubber.

In case of both the high-tension heat treatment and PCI, when $\Delta E_n + \Delta S$ of the cord exceeds 8.0%, if the heat shrinkage is made small, $\Delta E_n$ becomes too large, so that even if the internal pressure in PCI is made large, it is difficult to obtain a sufficient modulus of elasticity or an elongation $\Delta Ehd n$ under a tension of 2 g/D of not more than 4.5% as a tire cord, while if $\Delta E_n$ is made small by heat treatment, the heat shrinkage becomes large and the dimensional stability lowers. Moreover, it is fairly difficult to achieve $\Delta E_n + \Delta S$ of less than 6.0% by an actual operation, which may reduce the tensile strength.

Figure 2:
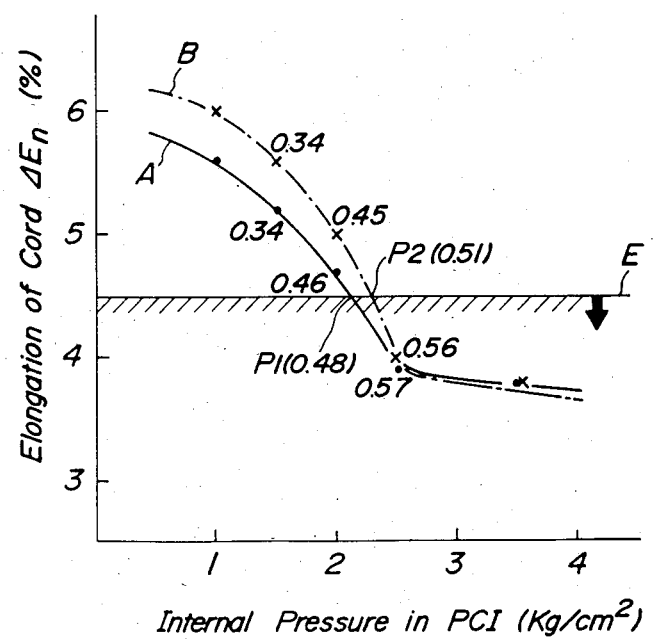

The invention will now be described with reference to the accompanying drawings, wherein:

FIG. 1 is a schematic radial half section of an embodiment of the radial tire according to the invention; and FIG. 2 is a graph showing a relation between the internal pressure in PCI and $\Delta E_n$.

The following examples are given in illustration of the invention and are not intended as limitations thereof.

EXAMPLES 1–4, COMPARATIVE EXAMPLES 1–13

Radial tires haviing tire sizes of 165 SR 13 and 185 SR 14 were manufactured by using as a carcass ply cords of polyester (polyethylene terephthalate) fibers produced by usual spinning method and high-stress spinning method and then subjected to an indoor drum test wherein the tire was continuously run on a drum at a speed of 65 km/hr under a JIS 200% load over a distance of 20,000 km. In the following Table 1 are shown properties of the polyester fibers produced by the usual spinning and high-stress spinning methods, twisting structure of cord composed of such polyester fiber, properties of the cord after high-tension heat treatment, $\Delta E_n$ and $\Delta S$ of the cord after PCI, and test results on the tire with a size of 165 SR 13. Similarly, the test results on the tire with a size of 185 SR 14 as well as the properties of the polyester fibers and their cords are shown in the following Table 2.

The properties of the fiber were measured as follows.

Intrinsic viscosity:

The measurement was performed in a mixed solvent of carbon tetrachloride and tetrachloroethane with a weight ratio of 1:1 at a temperature of 25° C.

Specific gravity:

It was measured by a method using a density-gradient tube.

$\Delta N$: It was measured by a polarizing microscope using a Berek compensator.

Number of terminal carboxyl groups:

The measurement was performed by dissolving a predetermined amount of polyester fiber into a predetermined amount of benzyl alcohol at 220° C., cooling in chloroform and titrating with sodium hydroxide.

TABLE 1

|  | Comparative Example 1 | Comparative Example 2 | Comparative Example 3 | Comparative Example 4 | Example 1 | Example 2 | Comparative Example 5 | Comparative Example 6 | Comparative Example 7 |
| --- | --- | --- | --- | --- | --- | --- | --- | --- | --- |
| Spinning method | usual spinning | high-stress spinning | high-stress spinning | high-stress spinning | high-stress spinning | high-stress spinning | high stress spinning | usual spinning | usual spinning |
| Fiber properties |  |  |  |  |  |  |  |  |  |
| intrinsic viscosity | 0.90 | 0.90 | 0.90 | 0.90 | 0.90 | 0.90 | 0.92 | 0.70 | 0.70 |
| specific gravity | 1.385 | 1.381 | 1.381 | 1.381 | 1.381 | 1.381 | 1.380 | 1.390 | 1.390 |
| $\Delta N$ ($\times 10^{-3}$) |  | 215 | 185 | 185 | 185 | 185 | 185 | 180 | 210 |
| number of terminal | 30 | 20 | 20 | 20 | 20 | 20 | 15 | 15 | 15 |

TABLE 1-continued

|  | Comparative Example 1 | Comparative Example 2 | Comparative Example 3 | Comparative Example 4 | Example 1 | Example 2 | Comparative Example 5 | Comparative Example 6 | Comparative Example 7 |
|---|---|---|---|---|---|---|---|---|---|
| carboxyl groups (equivalent/ton) |  |  |  |  |  |  |  |  |  |
| Twisting structure of cord |  |  |  |  |  |  |  |  |  |
| denier | 1,500 D/2 | 1,500 D/2 | 1,500 D/2 | 1,500 D/2 | 1,500 D/2 | 1,500 D/2 | 1,500 D/2 | 1,500 D/2 | 1,500 D/2 |
| twist turns/cable (T/10 cm *1) | 40 | 40 | 40 | 40 | 40 | 40 | 32 | 40 | 40 |
| twist turns/ply (T/10 cm) | 40 | 40 | 40 | 40 | 40 | 40 | 32 | 40 | 40 |
| NT | 0.49 | 0.49 | 0.49 | 0.49 | 0.49 | 0.49 | 0.39 | 0.49 | 0.49 |
| Cord after high-tension heat treatment |  |  |  |  |  |  |  |  |  |
| conditions |  |  |  |  |  |  |  |  |  |
| temperature (°C.) | 245 | 245 | 245 | 245 | 245 | 245 | 245 | 245 | 245 |
| tension (g/D) | 0.20 | 0.45 | 0.45 | 0.45 | 0.45 | 0.45 | 0.50 | 0.40 | 0.40 |
| properties |  |  |  |  |  |  |  |  |  |
| tensile strength (kg/cord) | 22.0 | 21.3 | 21.3 | 21.3 | 21.3 | 21.3 | 22.5 | 18.5 | 18.5 |
| $\Delta E_n$ (%) | 5.5 | 3.4 | 3.4 | 3.4 | 3.4 | 3.4 | 2.7 | 3.4 | 3.4 |
| $\Delta S$ (%) | 3.8 | 3.8 | 3.8 | 3.8 | 3.8 | 3.8 | 3.6 | 3.7 | 3.7 |
| $\Delta E_n + \Delta S$ (%) | 9.3 | 7.2 | 7.2 | 7.2 | 7.2 | 7.2 | 6.3 | 7.1 | 7.1 |
| flex fatigue resistance (min) | 400 | 1,200 | 1,200 | 1,200 | 1,200 | 1,200 | 55 | 100 | 100 |
| heat aging resistance (%) | 45 | 55 | 55 | 55 | 55 | 55 | 45 | 47 | 47 |
| Cord after PCI |  |  |  |  |  |  |  |  |  |
| temperature (°C.) | 115 | 115 | 115 | 115 | 115 | 115 | 115 | 115 | 115 |
| internal pressure (kg/cm$^2$) | 2.5 | 1.0 | 1.5 | 2.0 | 2.5 | 3.5 | 1.0 | 1.5 | 2.5 |
| $\Delta E_n$ (%) | 5.3 | 5.6 | 5.2 | 4.7 | 3.9 | 3.8 | 3.8 | 5.1 | 3.8 |
| $\Delta E_n + \Delta S$ (%) | 9.4 | 7.4 | 7.3 | 7.4 | 7.4 | 7.4 | 6.3 | 7.1 | 7.1 |
| Indoor drum test |  |  |  |  |  |  |  |  |  |
| durable life (km) | >20,000 | >20,000 | >20,000 | >20,000 | >20,000 | >20,000 | 2,000 | 15,000 | 12,000 |
| position of failure | — | — | — | — | — | — | cord breaking of carcass turnup portion positioned over rim flange | cord breaking of carcass turnup portion positioned over rim flange | cord breaking of carcass turnup portion positioned over rim flange |
| crack at belt end (mm) (after running over 20,000 km) | 4.0 | 4.1 | 3.9 | 3.2 | 1.0 | 1.0 | — | — | — |

*1 T/10 cm: twisting number per 10 cm

TABLE 2

|  | Comparative Example 8 | Comparative Example 9 | Comparative Example 10 | Comparative Example 11 | Example 3 | Example 4 | Comparative Example 12 | Comparative Example 13 |
|---|---|---|---|---|---|---|---|---|
| Spinning method | usual spinning | high-stress spinning | high-stress spinning | high-stress spinning | high-stress spinning | high-stress spinning | usual spinning | usual spinning |
| Fiber properties |  |  |  |  |  |  |  |  |
| intrinsic viscosity | 0.80 | 0.82 | 0.82 | 0.82 | 0.82 | 0.82 | 0.70 | 0.70 |
| specific gravity | 1.387 | 1.386 | 1.386 | 1.386 | 1.386 | 1.386 | 1.390 | 1.390 |
| $\Delta N$ ($\times 10^{-3}$) |  | 205 | 181 | 181 | 181 | 181 | 181 | 202 |
| number of terminal carboxyl groups (equivalent/ton) | 30 | 20 | 20 | 20 | 20 | 20 | 15 | 15 |
| Twisting structure of cord |  |  |  |  |  |  |  |  |
| denier | 1,000 D/2 | 1,000 D/2 | 1,000 D/2 | 1,000 D/2 | 1,000 D/2 | 1,000 D/2 | 1,000 D/2 | 1,000 D/2 |
| twist turns/cable (T/10 cm) | 49 | 49 | 49 | 49 | 49 | 49 | 49 | 49 |
| twist turns/ply (T/10 cm) | 49 | 49 | 49 | 49 | 49 | 49 | 49 | 49 |
| NT | 0.49 | 0.49 | 0.49 | 0.49 | 0.49 | 0.49 | 0.49 | 0.49 |
| Cord after high-tension heat |  |  |  |  |  |  |  |  |

TABLE 2-continued

|  | Comparative Example 8 | Comparative Example 9 | Comparative Example 10 | Comparative Example 11 | Example 3 | Example 4 | Comparative Example 12 | Comparative Example 13 |
|---|---|---|---|---|---|---|---|---|
| treatment conditions |  |  |  |  |  |  |  |  |
| temperature (°C.) | 245 | 245 | 245 | 245 | 245 | 245 | 245 | 245 |
| tension (g/D) | 0.20 | 0.45 | 0.45 | 0.45 | 0.45 | 0.45 | 0.40 | 0.40 |
| properties |  |  |  |  |  |  |  |  |
| tensile strength (kg/cord) | 15.0 | 14.6 | 14.6 | 14.6 | 14.6 | 14.6 | 13.3 | 13.3 |
| $\Delta E_n$ (%) | 5.4 | 3.5 | 3.5 | 3.5 | 3.5 | 3.5 | 3.4 | 3.4 |
| $\Delta S$ (%) | 3.9 | 3.6 | 3.6 | 3.6 | 3.6 | 3.6 | 3.4 | 3.4 |
| $\Delta E_n + \Delta S$ (%) | 9.3 | 7.1 | 7.1 | 7.1 | 7.1 | 7.1 | 6.8 | 6.8 |
| flex fatigue resistance (min) | 450 | 1,300 | 1,300 | 1,300 | 1,300 | 1,300 | 120 | 120 |
| heat aging resistance (%) | 45 | 50 | 50 | 50 | 50 | 50 | 47 | 47 |
| Cord after PCI |  |  |  |  |  |  |  |  |
| temperature (°C.) | 120 | 120 | 120 | 120 | 120 | 120 | 120 | 120 |
| internal pressure (kg/cm²) | 2.5 | 1.0 | 1.5 | 2.0 | 2.5 | 3.5 | 1.5 | 2.5 |
| $\Delta E_n$ (%) | 5.8 | 6.0 | 5.6 | 5.0 | 4.0 | 3.8 | 5.4 | 3.6 |
| $\Delta E_n + \Delta S$ (%) | 9.3 | 7.1 | 7.1 | 7.1 | 7.1 | 7.1 | 6.8 | 6.8 |
| Indoor drum test |  |  |  |  |  |  |  |  |
| durable life (km) | >20,000 | >20,000 | >20,000 | >20,000 | >20,000 | >20,000 | 13,000 | 8,000 |
| position of failure | — | — | — | — | — | — | cord breaking of carcass turnup portion positioned over rim flange | cord breaking of carcass turnup portion positioned over rim flange |
| crack at belt end (mm) (after running over 20,000 km) | 3.7 | 3.7 | 3.5 | 2.6 | 1.3 | 1.2 | — | — |

As shown in Table 1, Examples 1 and 2 satisfy all features of the invention, particularly $\Delta E_n$ of not more than 4.5% and $\Delta E_n + \Delta S$ of not more than 8.0% in the cord after PCI and do not fail even after the running over 20,000 km in the indoor drum test and are very small in the crack at belt end. On the contrary, Comparative Examples 1, 6 and 7 do not satisfy the fiber properties among the features of the invention, while NT in Comparative Example 5 is less than 0.4. Furthermore, Comparative Examples 1 and 6 do not satisfy $\Delta E_n$ or $\Delta E_n + \Delta S$ after PCI as defined in the invention and are poor in the durability. Moreover, Comparative Examples 6 and 7 are small in the intrinsic viscosity, so that the tensile strength is low.

On the other hand, cords composed of high-stress spun fibers in Comparative Examples 2–4 satisfy the fiber properties and twisting structure as defined in the invention, but cannot satisfy $\Delta E_n$ after PCI because the internal pressure in PCI is insufficient. Furthermore, the durability against crack at belt end is fairly poor as compared with the case of Examples 1 and 2.

In Table 2, Comparative Examples 8, 12 and 13 do not satisfy the fiber properties as defined in the invention, and particularly Comparative Examples 8 and 12 are outside the range of $\Delta E_n$ or $\Delta E_n + \Delta S$. Comparative Examples 9–11 satisfy the fiber properties and NT, but $\Delta E$ exceeds 4.5% because the internal pressure in PCI is insufficient. The tires of these comparative examples are poor in the durability.

From the results of Tables 1 and 2 is considered a relation between the internal pressure in PCI and $\Delta E_n$ after PCI as follows. In general, a relation between the internal pressure of the tire and the tension of the cord is represented by the following equation (I):

$$P = \frac{2N'iR_m}{R_m^2 - R_v^2} \cdot T_m \qquad (I)$$

wherein P is an internal pressure (kg/cm²), $T_m$ is a tension of cord (kg/cord), N', i, $R_m$ and $R_v$ are the same as previously mentioned. Further, P can be represented by the following equation (II):

$$P = \alpha T_m = \alpha T'_m \times D \qquad (II)$$

wherein $T'_m$ is a tension of cord per unit denier (kg/denier, cord), D is a total denier and $\alpha$ is a carcass tension coefficient represented by $$\frac{2N'iR_m}{R_m^2 - R_v^2}.$$

In the above equations, N', i, $R_m$, $R_r$ and $R_v$ are numerical values inherent to the kind of the tire used as shown in the following Table 3, which are put into the equation (I) or (II) to obtain the tire cord tensions $T_m$ and $T'_m$ shown in Table 3 corresponding to the internal pressure P in PCI. And also, $\Delta E_n$ and $\Delta S$ corresponding thereto are shown in Table 3.

TABLE 3

| Tire size | 165 SR 13 | 185 SR 14 |
|---|---|---|
| N' | 1 | 2 |
| i (cords/cm) | 7.0 | 6.0 |
| $R_m$ (cm) | 28.3 | 31.0 |

TABLE 3-continued

| Tire size | | 165 SR 13 | | | 185 SR 14 | | |
|---|---|---|---|---|---|---|---|
| $R_r$ (cm) | | 16.4 | | | 16.4 | | |
| $R_v$ (cm) | | 22.4 | | | 24.4 | | |
| $R_m^2 - R_v^2$ | | 299 | | | 366 | | |
| $\dfrac{2 \cdot N' \cdot iR_m}{R_m^2 - R_v^2}$ | | 1.325 | | | 2.033 | | |
| P (kg/cm²) | | 1.5 | 2.0 | 2.5 | 1.5 | 2.0 | 2.5 |
| $T_m$ (kg/cord) | | 1.13 | 1.51 | 1.89 | 0.74 | 0.98 | 1.23 |
| $T_m'$ (g/D) | | 0.34 | 0.46 | 0.57 | 0.34 | 0.45 | 0.56 |
| Cord | $\Delta E_n$ (%) | 5.2 | 4.7 | 3.9 | 5.6 | 5.0 | 4.0 |
| properties | $\Delta S$ (%) | 2.1 | 2.7 | 3.5 | 1.5 | 2.1 | 3.1 |

The relation between the internal pressure in PCI and $\Delta E_n$ based on the results of Table 3 is plotted in FIG. 2, wherein a curved line A shows the case of the tire having a size of 165 SR 13, a curved line B shows the case of the tire having a size of 185 SR 14, and numerals attached to each line are numerical values of $T'_m$.

In order to obtain $\Delta E_n$ of not more than 4.5% or to put $\Delta E_n$ into a shadowed region of FIG. 2, the internal pressure in PCI is dependent upon the size of the tire as apparent from FIG. 2. Moreover, the cord tension required for obtaining $\Delta E_n$ of 4.5% corresponds to tensions at intersections $P_1$ and $P_2$ of a straight line E ($\Delta E_n = 4.5\%$) with curved lines A and B in FIG. 2, which are 0.48 g/D in case of 165 SR 13 and 0.51 g/D in case of 185 SR 14.

Accordingly, $\Delta E_n$ of not more than 4.5% can be attained if the internal pressure in PCI is a value giving a tension of not less than 0.48–0.51. From this fact, it is obvious that the internal pressure P in PCI is sufficient to be $P \geq 0.5 \times D \times 10^{-3} \times \dfrac{2N'iR_m}{R_m^2 - R_v^2}$.

As apparent from the above, when the polyester fiber cords satisfying all features of the invention are applied to the carcass of the radial tire, the concentration of stress strain in ends of the carcass and belt can be reduced, whereby the durability of the tire can be considerably improved.

What is claimed is:

1. A pneumatic radial tire comprising a carcass composed of at least one ply containing polyester fiber cords embedded in rubber, said polyester fiber cord having such micro properties as a fiber than an intrinsic viscosity is 0.75–0.97, a specific gravity is 1.365–1.398 and number of terminal carboxyl groups is not more than 20, and having such properties as a cord that a twist count NT defined by the following equation (1) is 0.4–0.6 and an elongation $\Delta E_n$ under a tension of 2 g/denier in the cord produced through a post-cure inflation holding an inner temperature of a shoulder portion at at least 95° C. under an internal pressure P defined by the following equation (3) in accordance with a carcass tension coefficient $\alpha$ defined by the following equation (2) is not more than 4.5% and a sum of the elongation $\Delta E_n$ and heat shrinkage $\Delta S$ is not more than 8%:

$$NT = N \times \sqrt{0.139 \times D/2\rho} \times 10^{-3} \tag{1}$$

(wherein N is a twisting number per 10 cm of cord length, D is a total denier of cord and $\rho$ is a specific gravity of fiber);

$$\alpha = \dfrac{2N'iR_m}{R_m^2 - R_v^2} \tag{2}$$

(wherein N' is number of carcass plies, i is a cord count of carcass ply in crown center (cords/cm), $R_m$ is a maximum radius of carcass line (cm) and $R_v$ is an average value of $R_m$ and $R_r$ representing a radius of a rim); and $$0.5D.\alpha \times 10^{-3} \leq P \leq 2.5D.\alpha \times 10^{-3} \tag{3}.$$

2. A pneumatic radial tire according to claim 1, wherein said polyester fiber cord has a birefringence $\Delta N$ of $165 \times 10^{-3} - 195 \times 10^{-3}$ as a fiber.

3. A pneumatic radial tire according to claim 1, wherein said polyester fiber cord contains not less than 90 mol% of polyethylene terephthalate.

* * * * *